United States Patent
Bell

(10) Patent No.: US 6,636,265 B1
(45) Date of Patent: Oct. 21, 2003

(54) FOCUS FLUTTER PREVENTION IN TV RECEIVERS AND MONITORS

(75) Inventor: Isaac Michael Bell, Indianapolis, IN (US)

(73) Assignee: Thomson Licensing S.A., Boulogne (FR)

(*) Notice: Subject to any disclaimer, the term of this patent is extended or adjusted under 35 U.S.C. 154(b) by 342 days.

(21) Appl. No.: 09/589,212

(22) Filed: Jun. 7, 2000

Related U.S. Application Data

(60) Provisional application No. 60/177,291, filed on Jan. 21, 2000.

(51) Int. Cl.[7] .................................................. H04N 5/68
(52) U.S. Cl. ...................... 348/380; 348/377; 348/497; 348/806; 315/381
(58) Field of Search ................................ 348/380, 377, 348/379, 497, 173, 805, 806, 807, 808; 315/379, 380, 381, 382.1, 388

(56) References Cited

U.S. PATENT DOCUMENTS

| | | | | |
|---|---|---|---|---|
| 3,970,895 A | * | 7/1976 | Willis ......................... | 315/381 |
| 3,971,067 A | * | 7/1976 | Norman ....................... | 348/380 |
| 4,894,725 A | | 1/1990 | Sendelweck | |
| 5,349,389 A | | 9/1994 | Keller | |
| 5,835,161 A | | 11/1998 | Keller | |
| 5,889,557 A | * | 3/1999 | Sato .......................... | 348/380 |
| 5,892,544 A | * | 4/1999 | Ikegami et al. .............. | 348/380 |
| 5,894,327 A | * | 4/1999 | Griepentrog ................. | 348/379 |
| 6,040,664 A | * | 3/2000 | Dieterle et al. ............. | 315/383 |
| 6,188,435 B1 | * | 2/2001 | Ahmari et al. ............... | 348/380 |

* cited by examiner

Primary Examiner—John Miller
Assistant Examiner—Jean W. Désir
(74) Attorney, Agent, or Firm—Joseph S. Tripoli; Harvey D. Fried; Joseph J. Kolodka

(57) ABSTRACT

An inventive method for preventing focus flutter display in a TV receiver or monitor includes the steps of amplifying a received signal for driving cathode elements of a cathode ray tube, and delaying initial full amplification of the signal during the amplifying step for a duration sufficient to prevent focus flutter display on the tube. A corresponding inventive kine driver circuit that prevents display of focus flutter includes an amplifier for amplifying and coupling received video signals to cathode elements of a picture tube, and a control circuit for delaying full amplification of the video signals to be fed to the cathode elements for a duration sufficient to prevent focus flutter display on the tube.

9 Claims, 3 Drawing Sheets

FOCUS FLUTTER PREVENTION IN TV RECEIVERS AND MONITORS

This application claims the benefit of Provisional application No. 60/177,291, filed Jan. 21, 2000.

BACKGROUND

The invention relates generally to television receivers and monitors and, more particularly, to focus flutter prevention in TV receivers and monitors.

As used herein, the terms cathode ray tube (CRT), picture tube, and kine have the same meaning and are used interchangeably. Circuit elements repeated in different drawing figures are referenced by the same numerals.

Kine driver circuits in TV receivers or monitors are often prone to a problem referred to herein as focus flutter. Focus flutter occurs shortly after a television receiver is turned on. When power is first applied to a television receiver or monitor, the CRT filament is cold and there is no emission from the cathodes and, therefore, no beam. This lack of beam current causes the CRT cathodes to appear as open circuits. With no beam current the beam current limiter does not reduce contrast which controls the video gain of the TV receiver. At a maximum contrast control setting the video output signal from the source of video signals, e.g., a luma/chroma integrated circuit, is amplified to the greatest extent, which causes the high gain kine drivers to saturate.

In normal operation, a CRT's cathode potential is about 50–150 volts higher than its control grid (G1, see FIG. 1) potential. As a result, beam current is held within a normal range. However, the above-described condition of kine driver saturation causes the cathode voltage to fall to a level at or close to the level of the voltage on the grid G1 to produce a zero bias condition. In this zero or near zero bias condition, when the CRT filament has heated the cathodes enough to have emission, excessive beam current will begin to flow.

With some picture tubes excessive beam current can be partially intercepted by the focus electrode (F, see FIG. 1), causing focus current to flow. This, in turn, causes the focus voltage to drop and defocuses the beam, causing even more beam current to strike the focus electrode. This positive feedback phenomenon manifests itself as a brightness fluctuation of the picture, known to skilled artisans as focus flutter.

The focus flutter problem occurs, typically, for a few seconds after a short 5–8 seconds warm-up delay, during a turn-on with a high IRE luminance signal when the brightness and/or contrast controls are set high enough. The problem is relieved after 1 to 2 seconds because as the beam current begins to flow the beam limiter reduces the video gain and the kine drivers come out of saturation and the zero bias condition disappears. Factors contributing to focus flutter include the geometry of the electron gun assembly of the CRT, the underheated cathode, excessively high drive of the cathode before the beam limiter activates, and less than completely stabilized and regulated power supplies.

The most commonly used approach to reduce the problem of focus flutter has been to lower the maximum drive voltage applied to the cathode of the picture tube by reducing, for example, the signal applied to the kine driver's input or by reducing the kine driver's gain. A disadvantage of such an approach is the loss of the light output of the receiver at normal operating conditions. Another approach has been to blank the screen during the warm up period of the receiver through software means. This requires dedication of some memory resources that can be at a premium. The most fundamental approach is to redesign the picture tube guns by increasing the aperture of the central hole in the control grid G1 and the Focus electrodes to reduce the beam current interception. However, redesigning the picture tube is undesirable as it adds to the cost, time and manpower constraints and can degrade the beam spot size, i.e., resolution, at normal operating conditions.

Another solution proposed utilizes a diode clamp in the kine driver circuit to clamp voltage at the grid GI to a voltage level lower than the cathode voltage level, that prevents excessive beam current which would otherwise cause focus flutter, immediately following a cold cathode turn on. This solution has several drawbacks in that it alters operation of the receiver during both turn-on and normal operating conditions, during kine driver amplifier saturation the bias cannot go as low as 4V, whereas existing picture tubes can run into focus flutter mode during a turn-on at a bias voltage as high as 20V. The addition of diodes at the collectors of the kine driver amplifiers reduces the amplifiers' bandwidth by increasing their collectors' capacitance, which in turn reduces the resolution of the TV receiver.

SUMMARY OF INVENTION

An inventive method for preventing focus flutter display in a TV receiver or monitor includes the steps of amplifying a received signal for driving cathode elements of a cathode ray tube; and delaying initial full amplification of the signal during the amplifying step for a duration sufficient to prevent focus flutter display on the tube.

An inventive kine driver circuit that prevents display of focus flutter includes an amplifier for amplifying and coupling received video signals to cathode elements of a picture tube; and a control circuit for delaying coupling of amplified video signals to the cathode elements for a duration sufficient to prevent focus flutter display on the tube.

BRIEF DESCRIPTION OF THE DRAWINGS

Similar reference characters refer to similar parts in each of the FIGURES of the drawings.

DESCRIPTION OF THE INVENTION

Figure 1:
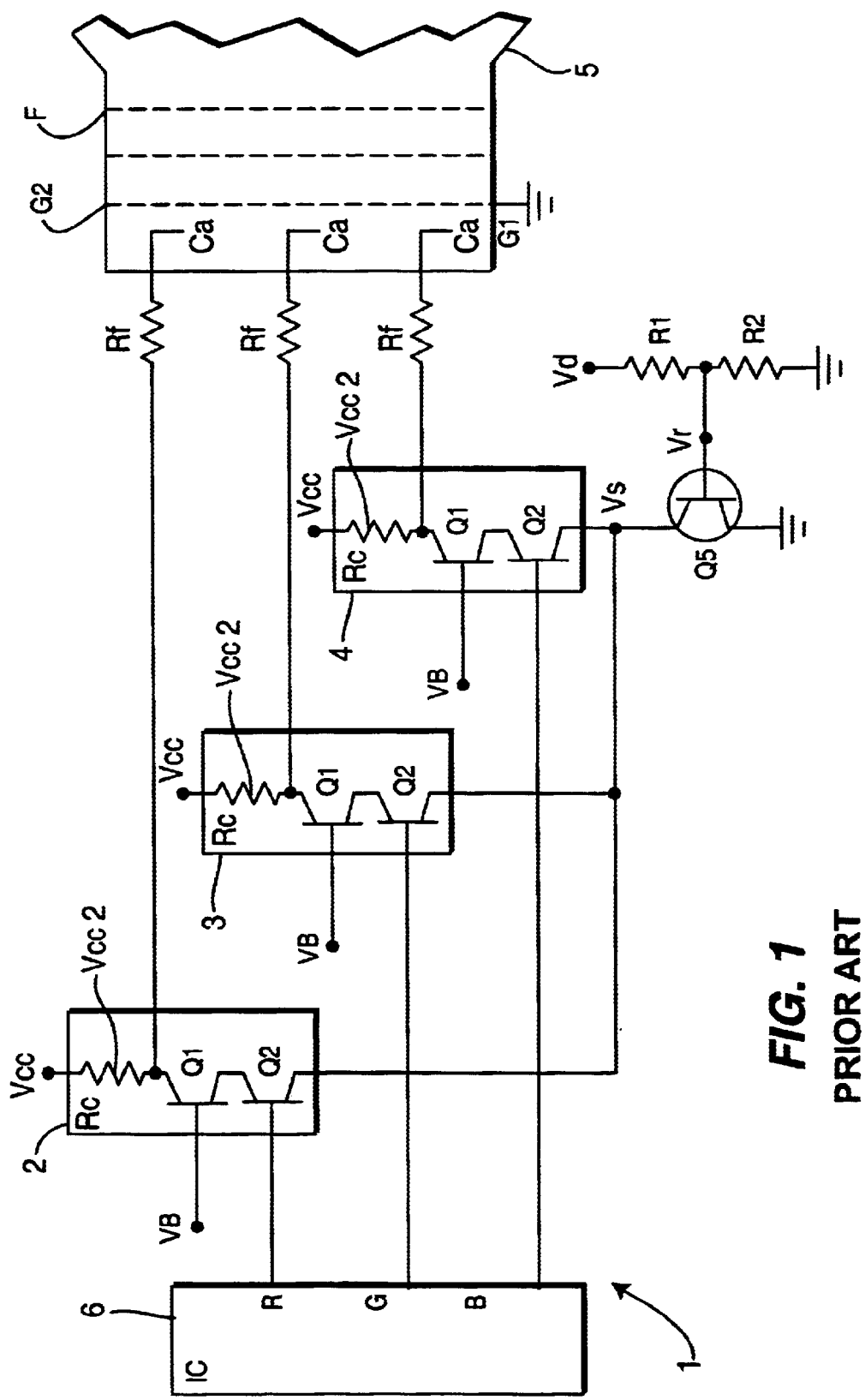
FIG. 1 is an exemplary circuit schematic of a known kine driver circuit.

A known kine driver circuit 1 according to FIG. 1 includes cascode amplifiers 2, 3 and 4 that amplify RGB color component signals from a luma/chroma processor 6 to drive CRT cathodes Ca. The CRT 5 depicted is a known type which includes a control grid G1 for regulating overall current of electron beams, a screen grid G2 which begins acceleration of the electrons towards the front, and the focus grid F which further accelerates and narrows the beams. The grid G1 can be either grounded or at some low potential and the luma/chroma processor 6 can be an integrated circuit IC form and is well known to skilled artisans.

Each of the cascode amplifiers 2, 3 and 4 include an NPN transistor pair Q1 and Q2 coupled to their respective emitter and collector terminals. A voltage Vcc is applied to load resistor Rc coupled to the collector terminal of the upper transistor Q1 of each cascode amplifier 2, 3 and 4. The collector voltage developed across the load resistor Rc drives the corresponding cathode Ca of the picture tube 5 through flushover resistor Rf. The base of each upper transistor is biased by voltage VB that is less than collector voltage Vcc2, which in turn is less than the voltage Vcc applied to the load resistor Rc. R, G and B color component signals from the luma/chroma processor IC 6 (not shown) are applied to base terminals of the lower cascode transistor Q2. The emitters of lower transistors Q2 are biased by a voltage source formed by a PNP transistor Q5 and resistor pair R1 and R2. Resistor pair R1 and R2 divide voltage Vd, coupled to resistor R1, to bias the base-emitter junction of transistor Q5 with a voltage Vr, which is a portion of voltage Vd. It is noted that the driver circuit 1 utilizes only one voltage source Vs that combines the currents from all three lower transistors Q2 of the cascode amplifiers 2, 3 and 4.

The resistive divider R1/R2 provides a reference voltage Vr, equal to VdR2/(R2+R1)), to the base of the voltage source transistor Q5. This reference voltage then controls the cascode currents through flushover resistors Rf and, consequently, the DC potentials of the picture tube cathodes Ca.

As noted before, TV receivers or monitors are often prone to the focus flutter problem, usually most visible in the form of a rapid and non-monotonic change of the focus of the picture during the first few seconds after the receiver or monitor has been turned on. The focus flutter occurs as a result of the control grid G1 and the focus electrode F intercepting some portion of the beam current during the warm up period of the receiver. During this short 5–10 second period voltage at the cathode Ca can drop as low as only a few volts above the control grid G1 voltage. The invention prevents a TV receiver or monitor from going into a focus flutter mode by delaying the complete turn on of the kine drivers until the receiver or monitor completes its warm-up. An initial increase of the kine driver's bias is gradually decreased synchronously with the warming up process of the receiver or monitor, which in turn provides a very graceful appearance on the screen of a picture that is properly focused.

Figure 2:
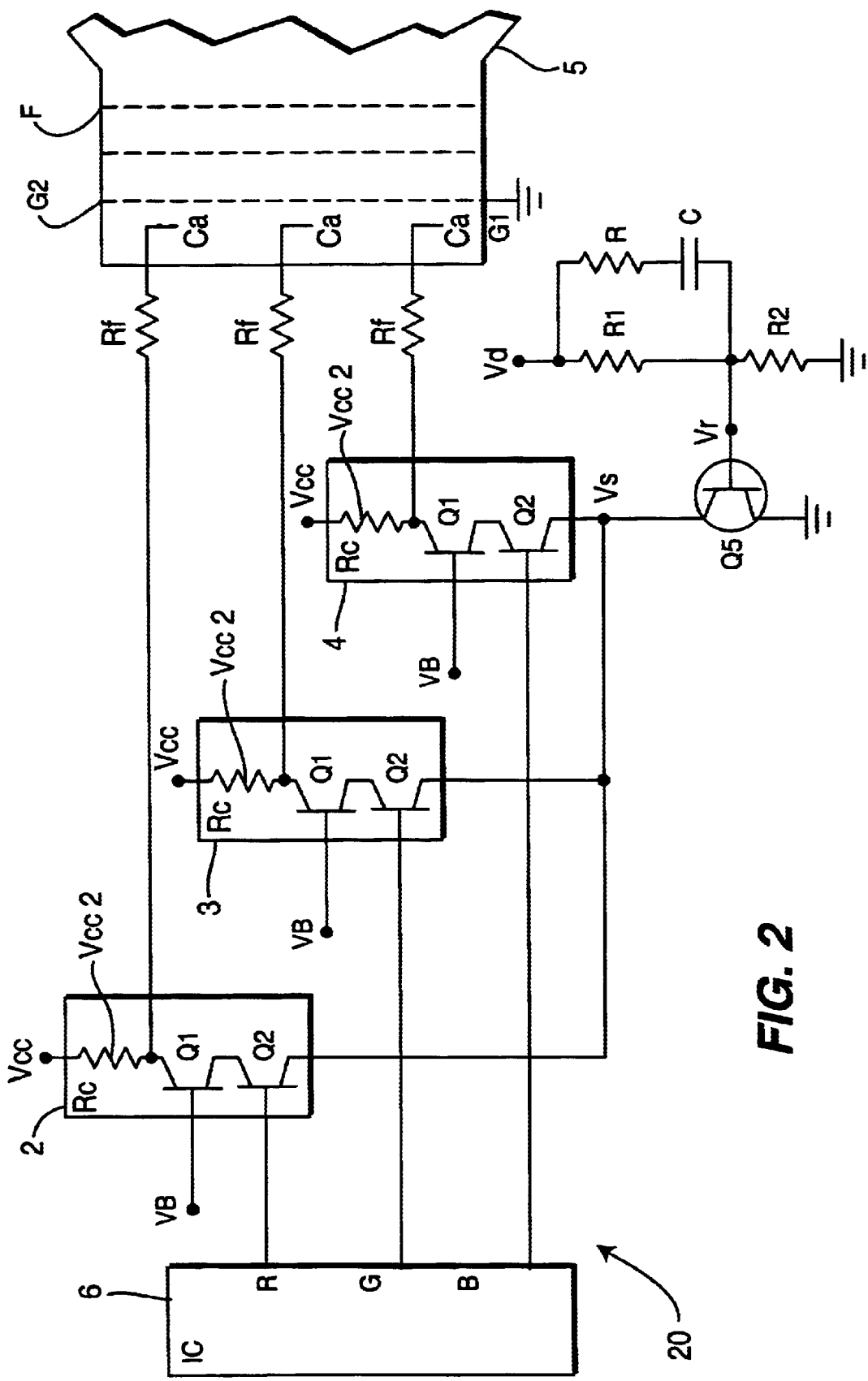
FIG. 2 includes the circuit schematic of FIG. 1 modified to incorporate the invention.

Referring to FIG. 2, the initial increase and the following gradual decrease of the voltage source Vs and the kine driver's bias, i.e., reference voltage Vr, is implemented by the addition of a series arrangement of a resistor and capacitor R, C parallel coupled to the upper resistor R1 of the resistive voltage divider pair R1, R2.

While the TV receiver/monitor is turned off, the capacitor C is completely discharged. As soon as the receiver/monitor is turned on and the Vd voltage is applied to the resistive divider R1, R2, the capacitor C starts charging through resistors R and R2. At this moment, the bias voltage at the base of the voltage source transistor is Vr*=VdR2/(R2+R*) >Vr, where resistance R*=RR1/(R+R1)<R1. At the first moment the charging capacitor C presents a short circuit and resistor R is effectively connected in parallel with R1. The increased bias keeps the cascode currents from an abrupt surge, which in turn keeps the picture tube cathode potentials from plunging too low. The minimum cathode Ca voltage depends on the choice of the resistor R value. Charging of the capacitor gradually reduces the bias voltage Vr* until it reaches the normal operating value Vr. The rate of charging of the capacitor is tau=(R+R2)C, which can be made to track the warming up process of the instrument by a proper choice of the value of the capacitor C. The tracking is achieved simultaneously for all three cathodes Ca since, as noted above, the modified voltage source controls all three currents. At the end of the warm-up process, the receiver/monitor operates as if the resistor R and capacitor C addition does not exist because the charged capacitor acts as an open circuit with respect to DC potentials.

Figure 3:
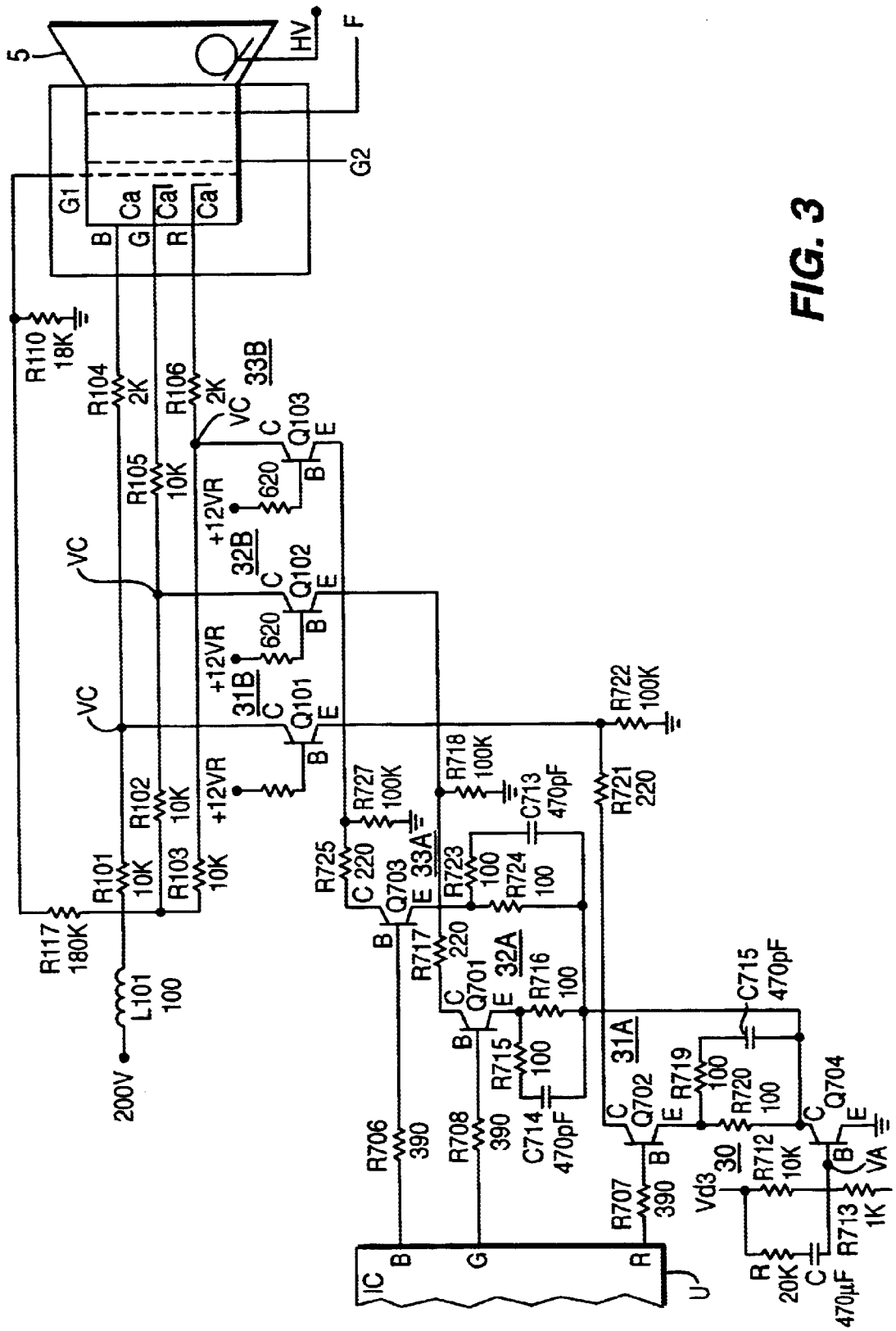
FIG. 3 is a circuit schematic of an exemplary kine driver employing the inventive focus flutter prevention.

A kine driver utilizing the inventive resistor R and capacitor C controlled driver bias is shown in FIG. 3. Cascode amplifiers, capable of outputting about 150V peak-to-peak amplify the R, G and B color component signals to drive the CRT 5. A lower input transistor Q702, Q701, Q703 is connected as a common emitter transistor circuit and a corresponding upper transistor Q101, Q102, Q103 is connected as a common base transistor circuit.

Color component R, G and B signals from the luma/chroma processor 6 are coupled across respective current limiting resistors R707, R708, R706 to base terminals B of respective lower cascode transistors Q702, Q701, Q703. Amplified R, G and B signals exit from the collector terminals C of respective upper transistors Q101, Q102, Q103. The collector current of the lower and upper transistor is approximately the same. However, the voltage across the collector-emitter junctions C to E of the lower and upper transistors is different. Collector-emitter voltage of the upper transistor Q101, Q102, Q103 can be around 200V, whereas the collector-emitter voltage of the lower transistor Q702, Q701, Q703 is less than 10V. Consequently, the power dissipated in the upper transistor can be twenty times that of the corresponding lower transistor.

Referring to FIG. 3, base terminals B of the upper transistors Q101, Q102, Q103 are biased by a +12V regulated supply through respective current limiting resistors R107, R108, R109. A 200V supply is dropped across inductor L101 and each of load resistors R101, R102 and R103 to develop a collector supply voltage at each of the upper transistors Q101, Q102, Q103. The 200V is also divided between resistors R117 and R110 to provide voltage to the control grid G1, although in other embodiments grid G1 can be grounded and resisters R117 and R110 are omitted altogether. Protection against arcing in the CRT 5 is provided by respective flushover resistors R104, R105 and R106.

As the G signal applied to the base B of transistor Q701 increases, transistor Q701 is more forward biased which causes the current in transistor Q102 to increase and cause its collector voltage Vc, to decrease. As the G signal decreases, the collector voltage Vc of transistor Q102, which is also the voltage of the cathode Ca for the green G electron gun (not shown) of the CRT 5, begins to increase towards a collector supply voltage of +200V. Also, as the G signal decreases, it is actually moving towards blanking or black. Beam current in the CRT 5 is a function of the bias voltage between the cathode Ca and the screen grid G1. As bias voltage decreases, beam current increases. Since the grid G1 is normally fixed, as the collector voltage of transistor Q102 tracks towards the power supply voltage, of +200V, bias voltage increases which in turn decreases beam current.

Power in transistor Q102 is limited by its load resistor R102. Resistor R102 variation is selected so that the output transistor Q102 runs at optimum power dissipation and bandwidth. Current from the CRT, in case of internal arcing, is limited by flushover resistor R105. Base current in transistor Q102 is limited by coupled resistor R108, which helps reduce the possibility of saturation. Transistor Q102 is kept turned on slightly even during blanking by the current draw through resistor R718, which decreases the radio frequency interference RFI generated from switching the transistor Q102 completely off and back on. Its effect can be seen by comparing the cathode voltage at blanking to the level of the Vcc supply voltage. Without this resistor R718, blanking level would be at the supply voltage. Current into transistor Q701 is limited by resistor R717 in case of CRT 5 arc. The gain in the G signal is determined by resistors R716 coupled to the emitter terminal of the lower transistor Q101 along with resistor R102 coupled to the collector terminal C of upper transistor Q102. Peaking and extension of the bandwidth of the G signal circuit is achieved with the resistor R715 and capacitor C714 combination, which effectively reduces the value of resistor R716 as the frequency increases.

The R and B signal circuits operate identically to that of the G signal circuit described above. Transistors Q101 and Q702, resistors R101, R719, R720, R721 and R722, and capacitor C715 in the R signal drive circuit 31A & B, and transistors Q103 and Q703, resistors R103, R723, R724, R725 and R727, and capacitor C713 in the B signal drive circuit 33A & B correspond functionally to transistors Q102 and Q701, resistors R102, R715, R716, r717 and R 718 and capacitor C714, respectively, in the G signal drive circuit.

Gradual increase of collector currents in the cascode amplifiers 31A & B, 32A & B, 33A & B is effected by the cascode biasing circuit 30 coupled to each of the lower cascode amplifier circuits 31A, 32A, 33A. Operations of the cascode biasing circuit 30 is similar to that in FIG. 2

The emitter terminal E of PNP transistor Q704 forms a virtual AC ground where currents from all three cascode amplifier outputs return. Transistor Q704 provides an AC ground that is not 0V DC, which is desirable in order to bias the kine driver amplifiers 31A & B, 32A & B and 33A & B properly. Changing the DC voltage on the base B of transistor Q704 changes the DC voltage at the collector of the upper cascode transistors Q101, Q102 and Q103. The emitter of transistor Q704 is one junction voltage drop above the base terminal B divider voltage from resistors R712 and R713. The value of resistor R713 is different for different size picture tubes 5 because a very large picture tube 5 usually operates with the control grid G1 at 20 VDC, while at smaller tube sizes the control grid G1 is usually grounded.

While the TV receiver or monitor is turned off, the capacitor C is completely discharged. As soon as the receiver or monitor is turned on and Vd3 voltage is applied to the resistive divider R712, R713 the capacitor C starts charging through the resistors R and R713. At this moment, the bias at the base B of the voltage source transistor Q704 is Vr*=Vd3 R713/(R713+R')>Vr, where resistance R'=R (R712)/(R+R712)<R712. At first the charging capacitor C presents a short circuit and resistor R is effectively connected in parallel with resistor R712. The increased bias keeps the cascode currents from an abrupt surge, which in turn keeps the picture tube cathode C potentials from plunging too low. Minimum voltage at the cathodes Ca depends on the choice of the R value. Charging of the capacitor C gradually reduces the bias Vr* until it reaches the normal operating value Vr. The rate of charging of the capacitor is tau=(R+R713)C and it can be made to track the warming up process of the receiver or monitor by a proper choice of the value of the capacitor C. The tracking is achieved simultaneously for all three cathodes since, as noted above, the modified voltage source controls all three currents. At the end of the warm up process the receiver or monitor operates as if the resistor R and capacitor C arrangement does not exist because the charged capacitor acts as an open circuit with respect to DC potentials.

The inventive kine driver arrangement provides substantial benefits in that the focus flutter control circuit elements affect the kine driver bias only when needed at turn-on during warm-up of the receiver or monitor. The duration of the circuit's operation is determined by the choice of the time constant of the resistor R and capacitor C in the base of the reference transistor. The bias of the cascode amplifiers can be set at any needed level simply by proper choice of the resistor R and capacitor C series. The circuit modification is simpler, less expensive, and requires less components taking up less physical space than the prior focus flutter control circuits. Also, the resistor R and capacitor C circuit addition does not intrude on any of the basic TV circuit's operating parameters as it automatically ceases to affect bias of the cascode amplifiers after a few initial seconds of the warm-up period of the TV receiver or monitor.

An additional benefit of the inventive circuit also prevents the appearance of colored, usually red, fringes on the vertical lines, known as "red bleeding, by preventing the kine drivers from going into deep saturation in the first few seconds after the TV receiver/monitor is turned on. The circuit modification to incorporate the invention can be implemented without difficulty at a cost of less than two cents.

I claim:

1. A kine driver circuit that prevents display of focus flutter comprising:
   cascode amplifiers for amplifying and coupling received video signals to cathode elements of a picture tube; and
   a transistor circuit for biasing said cascade amplifiers and delaying coupling of amplified said video signals to said cathode elements for a duration sufficient to prevent focus flutter display on said tube, said transistor circuit including a transistor biased by a voltage divider of first and second resistors coupled to a base terminal of said transistor, and a series combination of a resistor and capacitor coupled in parallel with said first resistor.

2. The circuit of claim 1, wherein said capacitor in a DC open circuit condition isolates said resistor from said voltage divider and in a transient short circuit condition couples said resistor in parallel with said first resistor.

3. A kine driver circuit capable of preventing focus flutter comprising:
   a first power supply;
   amplifiers coupled to said first power supply for driving cathode elements of a picture tube with video signals amplified by said amplifiers; and
   a second power supply coupled to said amplifiers and being varied to control timing of when said amplifiers couple amplified said video signals to said cathode elements said second power supply including a transistor having a conducting junction coupled to said amplifiers and a control terminal coupled to a variable voltage divider circuit, said variable voltage divider circuit comprises a voltage divider of first and second resistors, and a series arrangement of a resistor and capacitor coupled in parallel with said first resistor.

4. The circuit of claim 3, wherein said amplifiers comprise cascode amplifiers biased by said second power supply.

5. The circuit of claim 3, wherein said capacitor in a DC open circuit condition isolates said resistor from said first resistor and in a transient short circuit condition couples said resistor in parallel with said first resistor.

6. In a television receiver or monitor, a kine driver circuit comprising:
   a picture tube having cathode elements and a control grid, said picture tube being susceptible to focus flutter during initial beam current loading of less than fully heated cathode elements; and a kine driver circuit comprising:
   amplifiers with inputs for receiving respective video signals to be amplified and driving respective said cathode elements with amplified said video signals, and
   a voltage supply circuit for providing a voltage bias of said amplifiers to control currents in said cascode elements such that coupling of said amplified video signals to said cathode elements is delayed for a time period sufficient to prevent said focus flutter, said voltage supply circuit including a voltage divider of first and second resistors coupled in parallel with a series arrangement of a resistor and capacitor.

7. The apparatus of claim 6, wherein said amplifiers comprise cascode amplifiers including an upper transistor coupled to said cathode elements and a lower transistor coupled to said voltage supply circuit.

8. The apparatus of claim 6, wherein said bias voltage has a varying value when said capacitor is not fully charged and a fixed value when said capacitor is charged.

9. The apparatus of claim 8, wherein said first resistor is coupled in parallel with said resistor when said capacitor is in the process of charging that is in a transient condition and said resistor is isolated from said first resistor when said capacitor is fully charged.

* * * * *